United States Patent
Otaki et al.

(10) Patent No.: US 6,551,392 B1
(45) Date of Patent: Apr. 22, 2003

(54) LIQUID PRESSURE TRANSFER INK, LIQUID PRESSURE TRANSFER FILM, LIQUID PRESSURE TRANSFER ARTICLE AND LIQUID PRESSURE TRANSFER METHOD

(75) Inventors: Nobuyuki Otaki, Shimizu (JP); Kazuhiro Yamamoto, Shimizu (JP); Misao Sugiyama, Shimizu (JP)

(73) Assignee: Cubic Co., Ltd., Shizuoka-Ken (JP)

( * ) Notice: Subject to any disclaimer, the term of this patent is extended or adjusted under 35 U.S.C. 154(b) by 0 days.

(21) Appl. No.: 09/202,588

(22) PCT Filed: Feb. 25, 1998

(86) PCT No.: PCT/JP98/00756

§ 371 (c)(1),
(2), (4) Date: Dec. 17, 1998

(87) PCT Pub. No.: WO98/47973

PCT Pub. Date: Oct. 29, 1998

(30) Foreign Application Priority Data

Apr. 23, 1997 (JP) ............................................... 9-105541

(51) Int. Cl.$^7$ .............................. C09D 11/00; B32B 3/00
(52) U.S. Cl. ................ 106/31.6; 106/31.72; 106/31.69; 428/195
(58) Field of Search .............................. 106/31.6, 31.72, 106/31.69; 428/195; 427/466

(56) References Cited

U.S. PATENT DOCUMENTS 5,925,452 A * 7/1999 Niwa et al. .............. 428/308.4
6,103,342 A * 8/2000 Niwa et al. ................ 428/146
6,196,674 B1 * 3/2001 Takemoto ................... 347/103
2001/0003611 A1 * 6/2001 Otaki et al. ................. 428/195

FOREIGN PATENT DOCUMENTS

| EP | 913439 A1 * | 5/1999 | ........... C09D/11/02 |
| EP | 918078 A1 * | 5/1999 | ........... C09D/11/10 |
| JP | 8-238897 | 9/1996 | ........... B44C/1/175 |

* cited by examiner

Primary Examiner—Mark L. Bell
Assistant Examiner—Veronica F. Faison
(74) Attorney, Agent, or Firm—Pearne & Gordon LLP

(57) ABSTRACT

A pattern-transferring film having a print pattern provided on an upper surface thereof is floated on a liquid surface within a transferring bath and an objective body is immersed into a liquid within the transferring bath together with the pattern transferring film under a liquid pressure so as to transfer the print pattern onto the objective body. An ink set of at least blue, yellow and red inks is used for printing the pattern on the pattern-transferring film. Each of the printing inks comprises at least a resin ingredient and a pigment including color pigments. The color pigment for the blue ink is a phthalocyanine blue, the color pigment for the yellow ink is an isoindolinone yellow and the color pigment for the red ink is a quinacridone red. The ink set may include one or both of a white ink and a black ink. The color pigment for the white ink is a titanium white and the color pigment for the black ink is a carbon black. All the five color printing inks have a weather resistance of more than 3000 hours on a weather resistance test by a JIS based sunshine weather meter and therefore a color tone of the transferred pattern obtained by using these printing inks is balanced and the pattern transferred article having such a transferred pattern has the same weather resistance, which causes the article to have its life span maintained.

18 Claims, No Drawings

LIQUID PRESSURE TRANSFER INK, LIQUID PRESSURE TRANSFER FILM, LIQUID PRESSURE TRANSFER ARTICLE AND LIQUID PRESSURE TRANSFER METHOD

TECHNICAL FIELD

This invention pertains to a liquid pressure pattern-transferring ink including an alkyd resin as a fundamental ingredient used for transferring and printing appropriate print patterns such as wood grain patterns, marble patterns or other patterns by using a liquid pressure on an objective article (a body to which the print pattern is to be transferred) having a three-dimensional surface such as a curved surface or the like. More particularly, this invention pertains to an improvement on a liquid pressure pattern-transferring ink which is suitably useful for printing print patterns to be transferred on an objective article such as car bodies which tend to be exposed to severe atmospheres such as sunlight, weather and so on. Furthermore, this invention pertains to an improvement on a liquid pressure pattern-transferring ink to be used for printing a print pattern on a surface of an objective article exposed to such severe atmospheres and including an alkyd resin as a fundamental component.

Furthermore, this invention pertains to a pattern-transferring film having a print pattern printed thereon by the liquid pressure pattern-transferring ink, a liquid pressure pattern-transferred article having a predetermined print pattern transferred from the pattern-transferring film by using a liquid pressure and a method of transferring a print pattern on an objective article by using the pattern-transferring film.

TECHNICAL BACKGROUND

A method of transferring onto an objective body or article (a body to which a print pattern is to be transferred) by using a liquid pressure a print pattern on a pattern-transferring film floated on a liquid surface has been used for printing the print pattern on the objective body having a three-dimensional surface such as a curved surface and so on. The liquid to be used may be typically water and may be a liquid other than the water if it has no trouble for the liquid pressure pattern-transferring operation.

This liquid pressure pattern-transferring method is one in which a liquid-soluble or liquid-swelling pattern-transferring film having a predetermined print pattern of no liquid solution provided thereon is floated on a surface of a liquid flowing within a transferring bath and is made swelled by the liquid and then the objective, body is immersed into the liquid within the transferring bath in a manner faced to the pattern-transferring film and has the print pattern transferred from the pattern-transferring film by using a liquid pressure.

In case that a print pattern should be printed on an objective body to be used in a place such as a building room or a car room where it is never exposed to an outdoor atmosphere, a printing ink is not required to have a weather resistance, but in case that the print pattern should be printed on an objective body such as a car hood or a car panel including a fender or the like exposed to an outdoor atmosphere, the printing ink is required to have a weather resistance so that the color of the transferred pattern neither changes nor fades while it is exposed to the outdoor atmosphere.

In general, the printing ink for printing the print pattern on the pattern-transferring film to be used for the liquid pressure transferring method comprises a resin serving as binder, a plasticizer serving to adjust a hardness of the resin, a pigment serving to provide a color thereto and a solvent serving to solve the resin into a liquid. The print pattern to be used for being transferred under a liquid pressure may be formed by a gravure printing method by using a single or a plurality of inks among yellow, red, blue, white and black inks while they are of a primary color or of a blended color so that a variety of colors appear where dots of the primary or blended color are superposed one on another.

A printing ink of prior art has used a relatively inexpensive pigment having a sharpness of its color and more particularly has a phthalocyanine blue as blue pigment, an anatase type titanium white as white pigment, a carbon black as black pigment, a permanent red as red pigment and a disazo yellow as yellow pigment.

Such a prior art printing ink has no problem when it is used for printing the print pattern on the surface of the indoor objective body by the liquid pressure pattern transferring method, but it is confirmed that when the prior art printing ink is used for printing the print pattern on the surface of the outdoor objective body exposed to severe outdoor atmospheres such as sunlight, weather and so on, the color of the pattern transferred thereon tends to change or fade.

Imagining that the color of the transferred pattern changing or fading was caused by the properties of the pigment in itself of the printing ink, the applicant made a weather resistance test on various metal test pieces having printing inks of various colors daubed by using a sunshine weather meter based on JIS (Japanese Industrial Standard) so as to confirm the weather resistance of the pigments included in the prior art printing inks. As a result, it was confirmed that the colors of the phthalocyanine blue as blue pigment, the anatase type titanium white as white pigment and the carbon black as black pigment neither changed nor faded even in more than 3000 hours, but the color of the permanent red as red pigment and the disazo yellow as yellow pigment changed or faded in about 1000 and 500 hours, respectively. It will be noted that the color of the pattern transferred from the print pattern on the pattern transferring film formed by using the prior art printing ink changed or faded because the pigments had a poor weather resistance.

The outdoor objective article such as a car panel including a car bonnet, a fender and so on is required to have a weather resistance corresponding to a life span of the car. A weather resistance of about 3000 hours determined by a weather resistance test using the sunshine weather meter will be normally enough for the car panel, but with the prior art printing ink used, the entire color of the transferred pattern is unbalanced due to the lower weather resistance of the red and yellow printing inks and as a result, the color of the transferred pattern on the outdoor objective article tends to change or fade.

On the other hand, the print pattern has a design provided as a collective form of dots on the pattern-transferring film by a gravure printing method as aforementioned. If the print pattern thus provided on the pattern-transferring film is in a dry state, then it is required to restore an adhesion property necessary for the pattern-transferring operation by returning from the dry state to an activated state by using an activator composite before it is transferred on the objective body.

In this case, the print pattern is required to have such an extensibility as allows the print pattern to be closely adhered to the objective body along the surface thereof. If a part of the ink of the print pattern is too much dissolved, the design pattern transferred and formed on the objective body tends to be destroyed. Reversely if a part of the printing ink is insufficiently dissolved, the print pattern will be transferred while a lump of ink remains. If the whole ink is excessively dissolved, then an arrangement of ink dots will be broken so that the transferred design pattern will be made blurred. Thus, such phenomena have to be prevented. In the description, the two former phenomena will be referred to as "a disarrangement of the transferred pattern" while the last phenomenon will be referred to as "a blur of the transferred pattern".

In a liquid pressure pattern-transferring ink of the prior art including an alkyd resin as a fundamental component, the resin ingredient is composed of a short-oil alkyd resin of 2 to 15 weight % having a nitrocellulose of 3 to 20 weight % added thereto, the plasticizer is composed of a dibutyl phthalate of 2 to 7 weight % or the like and the liquid pressure pattern-transferring ink comprises a color pigment of 5 to 40 weight % and a solvent of the residue weight % in addition to the aforementioned ingredients.

The nitrocellulose serves to adjust a hardness of the resin ingredient in itself so as to increase its hardness, but since the hardness of the resin in itself is relatively high, the print pattern disadvantageously fails to be transferred while it is smoothly extended due to a shortage of the extensibility of the ink. With the print pattern being fully not extended, it cannot be closely adhered to the objective body along the surface thereof, which causes the portion of the print pattern not adhered thereto to be produced so that a pinhole or pinholes are formed therein.

As aforementioned, the dry ink which forms the print pattern provided on the pattern-transferring film retrieves its adhesion property by being dissolved by an activator.

However, even though the dry print pattern is swelled by the activator, a plain transferred pattern cannot be sometimes obtained because there occurs the disarrangement of the print pattern due to the partial dissolution of the printing ink or the shortage of dissolution of the printing ink and also because there occurs the phenomenon of the transferred pattern being blurred, which is caused by the original state of the ink dots broken by the excessive dissolution of the printing ink. Especially, the excessive dissolution of the printing ink occurs when too much amount of the activator composite is coated and is caused to lose a sharpness (clearness) of the pattern transferred to the objective body. Thus, it will be noted that the amount of the activator composite to be coated should not be excessive in view of the sharpness of the transferred pattern.

The activator essentially serves to swell the dry printing ink and restore the adhesive property thereof. Thus, it is difficult to effectively prevent the disarrangement of the transferred pattern due to the partial dissolution of the ink or the shortage of dissolution of the ink and the blurring of the transferred pattern due to the excessive dissolution of the ink even by using an appropriate amount of the activator. This has to be solved by improving the property of the ink.

Accordingly, it is an object of the invention to effectively transfer a print pattern under a liquid pressure pattern onto an outdoor objective body while a transferred pattern printed on the objective body has a weather resistance of at least about 3000 hours on measurement of a sunshine weather meter (referred to as a weather resistance of about 3000 hours hereinbelow).

It is another object of the invention to effectively transfer a print pattern under a liquid pressure pattern onto an outdoor objective body while a transferred pattern printed on the objective body has a weather resistance of at least about 3000 hours and also to effectively prevent a disarrangement or blurring of the transferred pattern by improving a hardness and a stickiness of the ink having a resin ingredient including an alkyd resin as a fundamental component while maintaining an extensibility of the ink.

It is further object of the invention to effectively transfer a print pattern under a liquid pressure pattern onto an outdoor objective body while a transferred pattern printed on the objective body has a weather resistance of at least about 3000 hours and also to easily obtain a print pattern which has a larger charging amount of a printing ink when a pattern such as a wood grain pattern is to be printed and therefore is required to have a good extensibility of the printing ink.

It is further object of the invention to effectively transfer a print pattern under a liquid pressure pattern onto an outdoor objective body while a transferred pattern printed on the objective body has a weather resistance of at least about 3000 hours and also to easily obtain a print pattern having an extensibility of a printing ink adapted to a relatively smaller charging amount of the printing ink when a pattern such as a marble pattern is to be printed.

The present invention is to provide a liquid pressure pattern-transferring ink adapted to accomplish the aforementioned objects, a liquid pressure pattern-transferring film having a print pattern printed by the liquid pressure pattern-transferring ink, a liquid pressure pattern-transferred article having a transferred pattern obtained by using the liquid pressure pattern-transferring film and a method of producing the liquid pressure pattern transferred article.

DISCLOSURE OF THE INVENTION

Principal Features

A first feature of the invention is to provide a set of liquid pressure pattern-transferring inks including at least a blue ink, a yellow ink and a red ink and each comprising a resin ingredient and a color pigment characterized by that said color pigment for said blue ink is a phthalocyanine blue, said color pigment for said yellow ink is an isoindolinone yellow and said color pigment for said red ink is a quinacridone red.

A second feature of the invention is to provide a liquid pressure pattern-transferring film having a liquid soluble or liquid swelling base film and a print pattern printed on said base film, said print pattern being printed by using a selected ink or inks among printing inks including a blue ink, a yellow ink, a red ink, a white ink and a black ink so that either of the yellow ink and the red ink or a combination of at least the yellow and red inks is selected, said printing inks each comprising a resin ingredient and a color pigment, said color pigment for said blue ink being a phthalocyanine blue, said color pigment for said yellow ink being an isoindolinone yellow, said color pigment for said red ink being a quinacridone red, said color pigment for said white ink being a titanium white and said color pigment for said black ink being a carbon black.

A third feature of the invention is to provide a liquid pressure pattern-transferred article formed by transferring a print pattern from a pattern-transferring film to an objective body by using a liquid pressure, said print pattern being printed by using a selected ink or inks among printing inks including a blue ink, a yellow ink, a red ink, a white ink and a black ink so that either of the yellow ink and the red ink or a combination of at least the yellow and red inks is selected, said printing inks each comprising a resin ingredient and a color pigment, said color pigment for said blue ink being a phthalocyanine blue, said color pigment for said yellow ink being an isoindolinone yellow, said color pigment for said red ink being a quinacridone red, said color pigment for said white ink being a titanium white and said color pigment for said black ink being a carbon black.

A fourth feature of the invention is to provide a method of transferring a print pattern from a pattern-transferring film to an objective body by using a liquid pressure, said print pattern being printed by using a selected ink or inks among printing inks including a blue ink, a yellow ink, a red ink, a white ink and a black ink so that either of the yellow ink and the red ink or a combination of at least the yellow and red inks is selected, said printing inks each comprising a resin ingredient and a color pigment, said color pigment for said blue ink being a phthalocyanine blue, said color pigment for said yellow ink being an isoindolinone yellow, said color pigment for said red ink being a quinacridone red, said color pigment for said white ink being a titanium white and said color pigment for said black ink being a carbon black and said print pattern which is made dry on said pattern-transferring film being transferred under said liquid pressure after said print pattern is so treated as to be activated by an activator.

A fifth feature of the invention is to provide a method of transferring a print pattern from a pattern-transferring film to an objective body by using a liquid pressure, said print pattern being printed by using a selected ink or inks among printing inks including a blue ink, a yellow ink, a red ink, a white ink and a black ink so that either of the yellow ink and the red ink or a combination of at least the yellow and red inks is selected, said printing inks each comprising a resin ingredient and a color pigment, said color pigment for said blue ink being a phthalocyanine blue, said color pigment for said yellow ink being an isoindolinone yellow, said color pigment for said red ink being a quinacridone red, said color pigment for white ink being a titanium white and said color pigment for said black ink being a carbon black and said print pattern being transferred under said liquid pressure before said print pattern is made dry on said pattern-transferring film.

The blue, yellow and red inks are ones to be necessarily used for forming a design as a collective form of dots on the pattern-transferring film by a gravure printing method. These inks are used while maintaining a primary color like they are used for a process color printing method or while providing a blended color obtained by blending primary color inks as they are used for a special color printing method. Of course, the primary color ink or inks and the blended color ink or inks may be combined. Although the phthalocyanine blue as the color pigment for the blue ink which has been used also in the prior art has the weather resistance of more than 3000 hours, the whole transferred pattern cannot have the expected weather resistance of more than 3000 hours due to its unbalance unless the other yellow and red inks have an enough weather resistance.

The isoindolinone yellow as the yellow pigment and the quinacridone red as the red pigment in the ink sets of the invention have a weather resistance of more than 3000 hours which is considerably higher than those of the permanent red as red pigment and the disazo yellow as yellow pigment in the ink sets of the prior art, and therefore it will be noted that as they are used together with the phthalocyanine blue as the blue pigment, the whole transferred pattern thus obtained can have an improved weather resistance of more than 3000 hours while the balance of the weather resistance property is maintained.

In the principal feature of the invention, the liquid pressure pattern-transferring ink sets may further include one or both of a white ink and a black ink. In this case, the color pigment for the white ink is an anatase type titanium white while the color pigment for the black ink is a carbon black.

In some gravure printing method, black ink dots may be added so as to express the natural black color which cannot be expressed even by blending three primary colors while white ink dots may be added so as to express the natural white color which cannot be similarly expressed even by blending three primary colors. It will be understood that although the anatase type titanium white as the color pigment for the white ink and the carbon black as the color pigment for the black ink are conventionally used, they originally have the weather resistance of more than 3000 hours and therefore these color pigments may be used for this invention as they are.

A First Additional Feature

The liquid pressure pattern-transferring inks of various colors may comprises a resin ingredient including an alkyd resin as a fundamental component, a plasticizer and a pigment and in this case, the resin ingredient may be preferably composed of a short-oil alkyd resin of 2 to 15 weight % having a cellulose acetate butyrate of 3 to 20 weight % added thereto, the plasticizer may preferably have a content of 2 to 4 weight % when the ink is of black while it may preferably have a content of 0.01 to 2 weight % when the ink is of color other than black.

This additional feature lies in a cellulose acetate butyrate (cellulose acetobutyrate) substituted for a nitrocellulose in a resin ingredient of the prior art liquid pressure pattern-transferring ink and in a lower ratio of ingredient of the plasticizer in accordance with the substitution of the resin ingredient.

The cellulose acetate butyrate is harder than the short-oil alkyd resin, but softer than the nitrocellulose. Thus, as the cellulose acetate butyrate is substituted for the nitrocellulose in the resin ingredient of the pattern-transferring ink, the resin ingredient of the ink in itself is made softer, which improves an extensibility of the print pattern on an objective body to which the print pattern is to be transferred. This results in the prevention of the disarrangement of the transferred pattern due to the shortage of dissolution of the ink or the partial dissolution of the ink.

However, if the amount of the cellulose acetate butyrate to be added is the same as that of the nitrocellulose used in the prior art ink, then there cannot be prevented the blurring of the transferred pattern due to the excessive dissolution of the ink when treated by an activator, which is caused by the ink composite being too softer.

With the content of the plasticizer in the printing ink being of 2 to 4 weight % in case of the black ink and being of 0.01 to 2 weight % in case of the ink of color other than black and with the amount of the plasticizer to be added being less than that of the printing ink including an alkyd resin as a fundamental component, the softness of the ink can be adjusted so that the hardness of the ink can be properly controlled not only when the ink is swelled, but also when it is dry. This serves to prevent the excessive dissolution of the ink so as to improve a sharpness of the transferred pattern.

A Second Additional Feature

Although the inks of various colors may comprise the resin ingredient including an alkyd resin as the fundamental component, the plasticizer and the pigment having the composition mentioned with respect to the principal feature, the resin ingredient may be composed of a short-oil alkyd resin having a nitrocellulose of low molecular weight added thereto.

A Third Additional Feature

Although the inks of various colors may comprise the resin ingredient including an alkyd resin as the fundamental component and the pigment, the resin ingredient may be composed of a short-oil alkyd resin having a nitrocellulose of high molecular weight and a nitrocellulose of low molecular weight added thereto.

These second and third features of the invention lie in a combination of the phthalocyanine blue as the color pigment for the blue ink, the isoindolinone yellow as the color pigment for the yellow ink, the quinacridone red as the color pigment for the red ink, the titanium white as the color pigment for the white ink and the carbon black as the color pigment for the black ink as well as the nitrocellulose as the resin ingredient. The nitrocellulose of the resin ingredient serves to improve a dispersibility of the pigments and also to improve a coloring property thereof. If there is used a nitro acetate butyrate as the resin ingredient which is the first additional feature, then the dispersibility of the pigments will be somewhat lowered and therefore the coloring property thereof will be lowered.

Thus, it will be noted that whether the cellulose acetate butyrate as the resin ingredient which is the first additional feature or the nitrocellulose of low molecular weight which is the second or third features may be used is based on which of the coloring property and the extensibility of the ink should be prior to the other.

The second and third additional features commonly have the nitrocellulose as the resin ingredient to be combined with the color pigment while having the expected improvement of the coloring property, but the second additional feature has the nitrocellulose of low molecular weight used as the resin ingredient while the third additional feature has the combination of the nitrocellulose of high molecular weight and the nitrocellulose of low molecular weight used as the resin ingredient. Thus, the ink of the according to the second additional feature has the extensibility higher than the ink according to the third additional feature has. As a result, the former ink will be suitable for printing the print pattern having the higher amount of the ink to be charged such as printing the wood grain pattern and so on while the latter ink will be suitable for printing the print pattern having the lower amount of the ink to be charged such as printing the marble pattern and so on.

BEST MODE FOR EMBODYING THE INVENTION

A fundamental method of transferring a print pattern under a liquid pressure by using a liquid pressure pattern-transferring ink of the invention is substantially identical to the prior art method as illustrated and described in U.S. Pat. Nos. 4,010,057 and 4,436,571, but a brief description of the method as described in the U.S. Pat. No. 4,436,571 will be made hereinjustbelow.

A pattern-transferring film to be used for the liquid pressure pattern transferring method can be produced by printing a print pattern such as a wood grain pattern or a marble pattern on a liquid soluble or liquid swelling base film of polyvinyl alcohol resin by a gravure printing method or other method using the printing ink of the invention. This pattern-transferring film is stored as a pattern-transferring film supply by being wound into a roll or making a bundle of sheets after dried.

In case the print pattern on the pattern-transferring film is transferred onto an objective body, a series of pattern-transferring film or every sheet of pattern-transferring film is supplied from the pattern-transferring film supply before it is supplied into a transferring bath and passes through a coating means such as a roll coater where it is treated by an activator which is coated onto the print pattern on the pattern-transferring film.

The activator to be used for the treatment serves to restore the printing ink from the dry state to the swelling state so that the print pattern has a state of adhesive property as if it is just after it is printed. In case the objective body has a primer coat, the activator preferably includes such a component as never rapidly dissolves a layer of the primer coat and has an affinity with a solvent of the primer coat. Such an activator may be suitably an activator composite as described in the aforementioned JP8-238897.

The pattern-transferring film having the print pattern thus treated by the activator is supplied onto a liquid surface within the transferring bath by a suitable film supplying means while the print pattern is upwardly faced. The base film of the pattern-transferring film is swelled and softened by a liquid within the transferring bath which may be typically water. Meanwhile, the print pattern on the pattern-transferring film is restored to the state of being fully swelled so as to be able to be transferred because it is treated by the activator before it reaches a transferring area within the transferring bath.

A conveying means serves to convey the objective body so as to partially or entirely immerse it into the liquid together with the transferring film while engaging the transferring film which is located at the transferring area within the transferring bath. Thus, the print pattern is transferred and closely adhered to a surface of the objective body under a liquid pressure which occurs when the objective body is immersed into the liquid. The print pattern can be closely adhered to and along the curved or complicated rough surface of the objective body in accordance with the extensibility of the ink.

The conveying means to convey the objective body withdraws up the objective body onto which the print pattern is attached out of the liquid surface and then conveys the pattern transferred body to a surface treatment room. Within the surface treatment room is showered a hot water onto the pattern transferred body to wash out the remaining portion of the base film of the transferring film. Thereafter, within the surface treatment room is blown a hot air onto the pattern transferred body so that the solvent included in the ink and the activator is evaporated. An over coat may be provided onto the pattern transferred body, if necessary.

As described in the U.S. Pat. No. 4,010,057 specification, the pattern transferring film may be used for transferring the print pattern under a liquid pressure by being supplied to the transferring bath before being made dry after the print pattern is printed. In this case, treating the transferring film by the activator is not required.

The objective body should be conveyed in such a pose that an air never enters between the objective body and the transferring film when it is immersed into the liquid within the transferring bath. The liquid within the transferring bath has a flow of given velocity so that the transferring film is moved to the transferring area at the given velocity and the objective body is immersed into the liquid at the velocity corresponding to that of the transferring film.

A fundamental feature of the pattern-transferring ink of the invention is to provide a set of liquid pressure pattern-transferring inks including at least a blue ink, a yellow ink and a red ink and each comprising a resin ingredient and a color pigment. The color pigment for the blue ink is a phthalocyanine blue, the color pigment for the yellow ink is an isoindolinone yellow and the color pigment for the red ink is a quinacridone red.

The liquid pressure pattern-transferring ink set may include either or both of a white ink and a black ink. In this case, the color pigment for the white ink is an anatase type titanium white while the color pigment for the black ink is a carbon black.

The ink set of the invention is different from the prior art ink set in regards to the ingredients because the former has the isoindolinone yellow substituted for a disazo yellow as the color pigment for the yellow ink among the prior art five color printing inks and has the quinacridone red substituted for the permanent red of the color pigment of the red ink.

In order to dot-print on the base film the print pattern to be transferred on the objective body by a gravure printing method, there are used the blue, yellow and red primary inks or the blended ink of them, but there may be additionally used the black ink for expressing the original black which cannot be expressed by the these three primary colors or the white ink for expressing the white color which cannot be expressed by blending these three primary colors.

As previously described, an outdoor article which is to be used while it is exposed to the severe outdoor atmospheres can be given no weather resistance corresponding to the life span of itself unless all the printing inks to be used for printing the print pattern have a predetermined weather resistance because the transferred pattern is unbalanced in its color tone, if otherwise.

The isoindolinone yellow as the yellow pigment and the quinacridone red as the red pigment in the ink sets of the invention have a weather resistance of more than 3000 hours which is considerably higher than the weather resistance of 500 hours of the disazo yellow as the yellow color pigment and also higher than the weather resistance of 1000 hours of the permanent red as the red pigment in the ink sets of the prior art. What is meant by "weather resistance" is a weather resistance hour in a weather test by a JIS sunshine weather meter which will be described later. Therefore, it will be noted that as they are used together with the blue ink including the phthalocyanine blue as the blue pigment originally having the weather resistance of more than 3000 hours or together with the white ink including the anatase type titanium white as the white pigment originally having the weather resistance of more than 3000 hours and the black ink including the carbon black as the black pigment originally having the weather resistance of more than 3000 hours as well as the aforementioned blue ink including the phthalocyanine blue, the collective dots of the three primary colors or the blended color and the white and black color dots have the whole weather resistance of more than 3000 hours improved.

A weather test was made by a sunshine weather meter based on JIS on various samples having a transferred pattern which was obtained by transferring on aluminum test pieces under a water pressure an ink layer of the pattern-transferring film which was in turn formed by coating various color inks including the aforementioned color pigments on a base film. In this weather test were used inks of various colors having the composition according to the embodied examples of the invention shown in Table 2.

This weather test was conducted by comparing two kinds of sample visually or by a color difference meter and confirming when the samples change or fade in their color. One kind of the sample was a tested sample which was obtained by continuously irradiating a light from a xenon lamp to the sample during every 25 minutes of one cycle and showering a water during the first 5 minutes among the 25 minutes of one cycle, which was repeated for various test times. Another kind of the sample was a non-tested sample which had the transferred pattern layer of the same colors as the aforementioned kind of sample without any weather test. The weather resistance of more than 3000 hours of the color pigments and therefore the printing inks corresponds to a life span of more than at least five years. Accordingly, it will be noted that the ink set including only the printing inks having such a weather resistance enables a balance of the color of the transferred pattern to be maintained at its balance even as time lapses and therefore, it can be suitably used for printing the print pattern to be transferred on the outdoor articles having a life span of more than at least five years.

Each of various color inks among the liquid pressure pattern-transferring ink set of the invention may typically comprises a resin ingredient including an alkyd resin as a fundamental component, a plasticizer and a pigment. The first additional feature accompanied by the principal feature of the invention may be provided in order to prevent a disarrangement of the transferred pattern due to the shortage of dissolution of the ink or the partial dissolution of the ink or the burling of the transferred pattern due to excessive dissolution of the ink and in order to improve the extensibility of the print pattern to the objective body so as to closely adhere the print pattern to the objective body. According to the additional first feature, the resin ingredient may be composed of a short-oil alkyd resin of 2 to 15 weight % having a cellulose acetate butyrate of 3 to 20 weight % added thereto, the plasticizer may have a content of 2 to 4 weight % when the ink is of black while it may have a content of 0.01 to 2 weight % when the ink is of color other than black. The plasticizer may be typically and suitably a dibutyl phthalate, but may be a plasticizer composite other than that.

Some examples of the specific ratio of ingredients of the liquid pressure pattern-transferring ink together with examples of the specific ratio of ingredients of the prior art transferring ink are shown in Table 1.

TABLE 1

| Ingredients of ink | Ratio of ingredients (weight %) | |
| --- | --- | --- |
| | Present invention | Prior art |
| Resin Ingredients | | |
| Short-oil alkyd resin | 2 to 15 | |
| Nitrocellulose | — | 3 to 20 |
| Cellulose acetobutyrate | 3 to 20 | — |
| Plasticizer (Butylphthalate) | | |
| (Black ink) | 2 to 4 | 4 to 7 |
| (Other ink) | 0.01 to 2 | 2 to 4 |
| Pigment | | |
| Blue pigment (phthalocyanine blue) | 5 to 40 | — |

TABLE 1-continued

| Ingredients of ink | Ratio of ingredients (weight %) | |
|---|---|---|
| | Present invention | Prior art |
| Yellow pigment (Isoindolinone yellow) | | |
| Red pigment (quinacridone red) | | |
| Black pigment (carbon black) | | |
| White pigment (Anatase type titanium white) | | |
| Blue pigment (phthalocyanine blue) | — | 5 to 40 |
| Yellow pigment (disazo yellow) | | |
| Red pigment (permanent red) | | |
| Black pigment (carbon black) | | |
| White pigment (Anatase type titanium white) | | |
| Solvent | | residue |

Although the pigment of every color includes the color pigment having a weather resistance of more than 3000 hours as previously described, it may have metal powder pigment such as aluminum powder, pearl mica powder, brass powder or the like for having a unique ornamental effect provided to the ink. A toluene, a xylene, an ethyl acetate, an acetone or the like may be used as the solvent.

In the ratio of ingredients shown in the Table 1, the ratio of the short-oil alkyd resin is from 2 to 15 weight %, but relatively smaller amount of the short-oil alkyd resin may be used when a large amount of color pigment is used while relatively larger amount of the short-oil alkyd resin may be used when the color of the color pigment is thin so that a concentration of the printing ink can be adjusted thereby. The ratio of either the nitrocellulose or the cellulose acetate butyrate is from 3 to 20 weight %, but a relatively smaller amount of them may be used when the ink is required to be softer so as to adjust a stickness of the ink to a lower value as it is swelled while a larger amount of them may be used when the ink is required to be harder so as to adjust the stickness of the ink to a higher value as it is swelled whereby the hardness of the resin ingredients of the ink is adjusted. The ratio of the pigment is from 5 to 40 weight % and set so as to cover a difference of the coloring property whereby the ink has the same coloring property.

These ratios of the ingredients are set within the aforementioned range in accordance with the conditions for liquid pressure pattern-transferring such as materials and sizes of the objective body and the velocity at which the pattern-transferring operation is made.

As noted from the aforementioned Table 1, the first additional feature of the liquid pressure pattern-transferring ink lies in (1) having a cellulose acetate butyrate substituted for a nitrocellulose of resin ingredients in the prior art pattern-transferring ink with the same ratio as that of the prior art nitrocellulose, and (2) having a ratio of 0.01 to 4 weight % of the plasticizer which is less than that of the plasticizer in the prior art ink, but having a ratio of 2 to 4 weight % in case of the black ink and 0.01 to 2 weight % in case of the ink other than black ink.

The cellulose acetate butyrate (cellulose acetobutyrate) is a mixed ester which is obtained by adding a nitric acid and an acetic acid to a cellulose, which is harder than the short-oil alkyd resin, but softer than the nitrocellulose and has a hygroscopic property lower than the nitrocellulose has. Since the short-oil alkyd resin is a nondrying resin, the cellulose acetate butyrate serves to avoid dust from being attached to the nondrying alkyd resin by lowering a stickness of the alkyd resin so as to make it as if it is apparently dry and also serves to provide to the too soft alkyd resin such a hardness as the ink is never partially dissolved. Furthermore, since the cellulose acetate butyrate which is softer than the nitrocellulose is substituted for the latter which is harder, it can make the best use of the softness of the short-oil alkyd resin. This can effectively prevent the transferred pattern from being disarranged, which is caused by the disorder of the ink due to the partial dissolution of the ink or by the remaining lump of the ink due to the shortage of dissolution of the ink while maintaining the extensibility of the ink by the softness of the short-oil alkyd resin even though the amount of the activator to be used is made lower in order to improve the sharpness of the transferred pattern. An improvement on the extensibility of the ink can effectively prevent a pinhole or pinholes due to an insufficiently close adhesion of the pattern to the objective body.

In the first additional feature of the invention, the content of the plasticizer in the ink of the invention is lower than that in the prior art ink because this prevents the transferred pattern from being blurred by the disorder of the ink dots from a predetermined state thereof when printed which is in turn caused by an excessive dissolution of the entire ink accompanied by the entirely lower hardness of the resin ingredients and by the excessively higher fluidity when swelled and also prevents the transferred pattern from being made lighter by the excessive extension of the ink.

Since the black color pigment is of inorganic one such as a carbon black, the content of the plasticizer should be as relatively high as 2 to 4 weight % in case of the black ink, but it should be as low as 0.01 to 2 weight % in case of the ink other than black.

Various samples (liquid pressure pattern transferred articles) were obtained by transferring the print pattern on the pattern-transferring films onto objective bodies which were of various ABS resins and had various roughnesses made on the surfaces thereof by sand papers, m which the pattern-transferring films were formed by printing the marble pattern on a base film of polyvinyl alcohol resin by using particular inks of examples having the principal feature and the first additional feature of the invention and the prior art by a multi-color gravure printing method and were coated with various amounts of an activator. The colors of the printing inks used for these samples were primary colors of blue, yellow and red.

There were made tests for confirming whether a pinhole or pinholes of allowable number or size were formed in the transferred patterns on the samples and cylinder tests for confirming a property of adhesion of the inks around cylinders from the pattern-transferring films formed by using the inks identical to those used for the samples. What is meant by "cylinder test" is one in which a curvature printing is made onto a surface of each of cylindrical test pieces along their longitudinal direction by the liquid pressure pattern-transferring method so as to confirm how well the ink is adhered to the test pieces around the surfaces thereof. According to the tests, a property of the inks can be determined from variation in the design pattern (how well the ink is adhered) because, with the objective bodies being cylindrical, the design pattern is deformed by being given substantial stress of deformation when transferred to the objective bodies and the degree and scale of the stress of deformation vary on the property of the inks.

The printing inks of the invention and of the prior art used in these examples had the following particular ratios of ingredients shown in Table 2.

TABLE 2

| Ingredients of ink | Examples of the Invention (Weight %) | Prior Art (weight %) |
|---|---|---|
| Short-oil alkyd resin | 3 | 3 |
| Nitrocellulose | — | 12 |
| Cellulose acetobutyrate | 12 | — |
| Butyl phthalate | | |
| (Black ink) | 2 | 4 |
| (Other ink) | 1 | 3 |
| Pigment | | |
| Blue pigment (phthalocyanine blue) | 5 to 40 | — |
| Yellow pigment (Isoindolinone yellow) | | |
| Red pigment (quinacridone red) | | |
| Black pigment (carbon black) | | |
| White pigment (Anatase type titanium white) | | |
| Blue pigment (phthalocyanine blue) | — | 5 to 40 |
| Yellow pigment (disazo yellow) | | |
| Red pigment (permanent red) | | |
| Black pigment (Carbon Black) | | |
| White pigment (Anatase type titanium white) | | |
| Solvent | | residue |

The activator used in these tests was of such particular ratio of ingredients as disclosed in Japanese Patent Application Laying-Open No. 238,897/1996 (JP8-238,897) which had the composition shown in Table 3.

TABLE 3

| Ingredients of Activator | Weight % |
|---|---|
| Short-oil alkyd resin | 20 |
| Cellulose acetate butyrate | 1 |
| Butyl cellosolve (solvent) | 30 |
| Butylcarbitol acetate (solvent) | 80 |
| Dibutyl phthalate (plasticizer) | 30 |

A weather resistance test was made on these samples having the marble pattern by the JIS based sunshine meter as previously described and it was confirmed that the transferred pattern on he surfaces of the samples neither had changed nor had faded a color thereof even though more than 3000 hours lapsed. Thus, it will be understood that the transferred pattern of these samples will neither change nor fade the color thereof even though more than five years lapse. Even though the transferred pattern includes a white ink, it will be positively guessed that the transferred pattern obtained by the ink set including the white ink will have a life span of more than five years because the white ink originally has the weather resistance of more than 3000 hours.

On the other hand, since the yellow and red inks among the prior art inks have the respective weather resistances of 500 hours and 1000 hours, respectively at the measurement by the JIS sunshine weather meter, it will be understood that the transferred pattern obtained from the print pattern on the pattern-transferring film using these inks will change or fade the color thereof in less than one year.

In Table 4 are shown the results of the tests for confirming whether a pinhole was produced or how many or large pinholes were produced with respect to these samples and the results of the cylinder tests performed with respect to the pattern-transferring films identical to those used for these samples. In the Table 4, variations in the amount of the activator to be coated are indicated by the counts of the coating gravure rolls and the degrees of the rough surfaces of the objective bodies which are to be samples are indicated by the counts of the sand papers. Furthermore, a symbol of "X" indicates that there were a pinhole or pinholes of unallowable number or scale in the print pattern on the surfaces of the samples while a symbol of "o" indicates that there were neither pinhole nor pinholes of unallowable number or scale therein. The two down figures of the counts of the gravure rolls indicate a depth ($\mu$m) of gravures or grooves in the gravure rolls and the figures in the parentheses of the counts indicate the amount ($g/m^2$) of the activator to be coated. It should be noted that the deeper gravures in the peripheral surfaces of the gravure rolls imply that a larger amount of the activator was coated while the smaller figures of the counts of the sand papers imply that they were rougher with the result that the surfaces of the objective bodies got rougher.

"Yes" in the Table 4 indicates that the state of adhesion of the ink around the test pieces in the cylinder tests was practically of problem while "No" indicates that it was practically of no problem.

TABLE 4

| Inks used for transferring films | Prior art | Example | Prior art | Example |
|---|---|---|---|---|
| Gravure rolls for coating activator | #100-35 (7 g/m²) | | #100-45 (10 g/m²) | |
| Sand paper for forming rough surface of objective body | | | | |
| 600 | X | X | X | X |
| 800 | X | o | o | o |
| 1000 | X | o | o | o |
| 1200 | X | o | o | o |
| 1500 | o | o | o | o |
| Cylinder test | Yes | No | No | No |

As noted from the Table 4, as the surface of the objective body which was to be a sample was treated by the sand paper of count No. 600 so as to make it substantially rougher, there occur pinholes of an unallowable number in case of both of the example of the invention and the prior art, but as printing was made onto the objective body which was treated by the sand paper of more than count No. 800 which is less rough, there occurs neither pinhole nor pinholes of unallowable number or scale except for the sample using the prior art printing ink on which a smaller amount of activator was coated.

More particularly, it will be noted that if the activator to be coated is of larger amount so as to fully dissolve both of the ink according to the example of the invention and the ink of the prior art, then there does not occur any or unallowable pinhole even though the surface of the objective body is slightly rough, but if the activator to be coated is of a smaller amount so as to insufficiently dissolve the ink of the prior art, then there occur unallowable pinholes even though the surface of the objective body is not so rough. This is caused by the ink of the prior art being not able to follow the rough surface of the objective body because of a poor extensibility of the prior art ink which is harder than the ink of the invention. On the other hand, since the ink of each of the examples of the invention has an extensibility and therefore can follow the objective body so as to be closely adhered thereto even though it has a relatively rougher surface, there tends to occur no pinhole or no unallowable ones.

If the amount of the activator to be coated on the prior art ink is larger, then a pinhole or unallowable pinholes can be prevented, but if a larger amount of the activator is coated, then the pattern of the product is blurred so as to get unclear which will be described with reference to Table 5 later. Thus, it will be noted that the ink according to the examples of the invention is more excellent because it effectively follows the rough surface of the objective body even though a smaller amount of activator is used and therefore produces no unallowable pinhole therein.

As noted from the result of the cylinder test, if the amount of the activator to be coated is larger, then both of the inks of the prior art and the example of the invention have an excellent adhesive property thereof to the test piece around the surface thereof, but it is confirmed that if the amount of the activator to be coated is smaller, then the ink of the prior art has a poor adhesive property to the test piece round the surface thereof. It will be noted that since the amount of the activator to be coated should be smaller in order to obtain the sharpness of the design pattern, the ink of the examples of the invention is more excellent than that of the prior art.

Table 5 shows the results of the test confirming the sharpness of the design patterns obtained by changing the amount of the activator to be coated with respect to the samples of the examples of the invention and the prior art. In this Table, the two down figures of the counts of the gravure rolls indicate a depth (μm) of gravures or grooves in the gravure rolls similarly and it should be noted that the deeper gravures in the peripheral surfaces of the gravure rolls imply that a larger amount of the activator is coated.

The figures of the results of the test in the Table 5 are ones obtained by estimating the sharpness of the transferred pattern on the liquid pressure pattern-transferred article relative to the sharpness of the transferred pattern on the liquid pressure pattern-transferred article which is obtained by coating the activator on the ink of the prior art with the gravure rolls of #100-45 (the depth of the roll grooves 45 mm) used, which sharpness is visually estimated as 5 point. The larger the figures become, the transferred pattern is sharper, which implies that the good result is obtained.

TABLE 5

| Inks used for transferring films | Gravure rolls | | |
|---|---|---|---|
| | #100-35 | #100-45 | #100-60 |
| Ink of prior art | — | 5 | 4.5 |
| Ink of example of invention | 8 | 7.5 | — |

As noted from the Table 5, it is in case the activator is coated by the gravure rolls of more than #100-45 that the design pattern can have the allowable sharpness obtained by using the prior art ink. It is confirmed that if the activator is coated on the prior art ink by the gravure rolls of less than #100-35 which implies that a smaller amount of the activator is coated, then there occurs a disarrangement of the transferred pattern due to the shortage of dissolution of the ink or the partial dissolution of the ink, but no sharpness of the transferred pattern. This is caused by the hardness of the ink of the prior art in itself. Reversely, if the activator is coated on the prior art ink by the gravure rolls of #100-60 by which the larger amount of the activator is coated, then the sharpness of the transferred pattern on the sample falls down into "4.5".

On the other hand, if the ink of the example of the invention has the activator coated by the gravure roll of #100-35 which coats the smallest amount of the activator, the transferred pattern on the sample has the much better sharpness of "8" and if the ink of the example of the invention has the activator coated by the gravure rolls of #100-45 which coats the larger amount of the activator, the transferred pattern on the sample has the slightly worse sharpness of "7.5", but it will be noted that it is much more excellent than the sharpness of "5" of the transferred pattern on the sample according to the prior art which is obtained in case of the same amount of the activator coated. This is based on the fact that the ink of the example of the invention has such a proper hardness and stickness as there occurs neither of the shortage of dissolution of the ink in itself, the partial dissolution thereof and the excessive dissolution thereof.

The aforementioned Tables 4 and 5 show only three tests made by using the ink having the ratio of ingredients shown in Table 2 and the activator having the ratio of ingredients shown in Table 3 with respect to both of the prior art and the examples of the invention, but it is confirmed that the same results could be obtained in the same tests made by using various inks of the invention having the ratio of ingredients falling within the range shown in the Table 1.

Describing the second additional feature of the invention hereinjustbelow, each ink of the liquid pressure pattern-transferring ink set of the invention comprises a resin ingredient including an alkyd resin as a fundamental component, a plasticizer and a pigment in the same manner as in the first additional feature of the invention, but the resin ingredient is composed of a short-oil alkyd resin having a nitrocellulose of low molecular weight added thereto.

The second additional feature of the invention lies in a combination of the color pigments including a phthalocyanine blue as a color pigment for the blue ink, an isoindolinone yellow as a color pigment for the yellow ink, a quinacridone red as a color pigment for the red ink, a titanium white as a color pigment for the white ink and a carbon black as a color pigment for the black ink and a nitrocellulose as a resin ingredient. The nitrocellulose as the resin ingredient serves to improve the dipersibility of these pigments and the coloring property thereof. If the cellulose acetate butyrate will be used for the resin ingredient as in the first additional feature, then the dispersibility of these pigments will be lowered and therefore the coloring property thereof will be also lowered.

Next, an example of the liquid pressure pattern-transferring ink having the second additional feature is shown in Table 6.

TABLE 6

| Ingredients of ink | (Weight %) |
|---|---|
| Short-oil alkyd resin | 5.5 |
| Nitrocellulose of low molecular weight | 9.6 |
| Blue pigment (phthalocyanine blue) | 8 to 40 |
| Yellow pigment (Isoindolinone yellow) | |
| Red pigment (quinacridone red) | |
| White pigment (Anatase type titanium white) | |
| Black pigment (carbon black) | 12.0 |
| Dioctyl phthalate (plasticizer) | 4.0 |
| Wax | 0.9 |
| Solvent | residue |

The wax has a function to control the pigments in the ink from sinking during its storage and therefore, with the wax added, the stirring operation of the ink can be advantageously omitted when printing the print pattern.

Since the ink having a component shown in the Table 6 includes the nitrocellulose of low molecular weight as the resin ingredients, it has an extensibility higher than that of the ink including either nitrocellulose of high molecular weight or nitrocellulose of high and low molecular weight, but lower than the ink having the first additional feature and therefore is suitably useful for printing the print pattern such as wood grain pattern or the like having a larger amount of ink to be charged.

Finally, describing the third additional feature of the invention hereinjustbelow, each ink of the liquid pressure pattern-transferring ink set according to the third additional feature comprises a resin ingredient including an alkyd resin as a fundamental component, a plasticizer and a pigment, but the resin ingredient is composed of a short-oil alkyd resin having a nitrocellulose of high molecular weight and also a nitrocellulose of low molecular weight added thereto, which is different from the first additional feature.

Since the resin ingredient of the ink according to the third additional feature includes nitrocellulose, it serves to improve the coloring property of the ink, but since it includes the nitrocellulose of high molecular weight, but no plasticizer, it has the extensibility lower than the ink according to the second additional feature and is suitably useful for printing the print pattern such as marble pattern or the like having a smaller amount of ink to be charged.

An example of the liquid pressure pattern-transferring ink is shown in Table 7.

TABLE 7

| Ingredients of ink | (Weight %) |
|---|---|
| Short-oil alkyd resin | 2.5 |
| Nitrocellulose of high molecular weight | 1.4 |
| Nitrocellulose of low molecular weight | 2.5 |
| Blue pigment (phthalocyanine blue) | 8 to 40 |

TABLE 7-continued

| Ingredients of ink | (Weight %) |
|---|---|
| Yellow pigment (Isoindolinone yellow) | |
| Red pigment (quinacridone red) | |
| White pigment (Anatase type titanium white) | |
| Black pigment (carbon black) | 12.0 |
| Solvent | residue |

Whether the invention should use the cellulose acetate butyrate which is the first additional feature or the nitrocellulose which is the second or third additional feature will be determined on which of three coloring property and the extensibility should be given priority. If both of the coloring property and the extensibility should be required, it will be noted that the ink according to the second additional feature will be slightly more preferred in view of the better finish of the outer appearance of the pattern-transferred article. It was confirmed that the samples having the transferred patterns obtained by being transferred under the liquid pressure by using the inks having the components shown in the Tables 6 and 7, respectively had had the weather. resistance of more than 3000 hours measured by the weather resistance test in the same manner as in the sample having the transferred pattern obtained by using the ink according to the example shown in the Table 2.

The liquid pressure pattern transferring ink according to the invention may be applied for transferring the print pattern onto the objective bodies of various materials other than the objective body of ABS resin. For instance, the objective bodies may be ones formed of organic or inorganic materials including mold goods formed of a thermoplastic or thermosetting resin such as acrylic resin, AS resin, vinyl chloride resin, polystyrene resin, noryl resin, phenol resin, urea resin, melamine resin and epoxy resin in the form of a simple substance or FRP or formed of metal, wood, stone or other suitable materials.

The activator serving to swell the dried ink on the pattern transferring film may be coated onto the transferring film immediately after the transferring film is floated onto the liquid surface or after the base film of the transferring film is swelled by the liquid (water) within the transferring bath as well as before it is floated on the liquid surface. The activator to be coated before the transferring film is floated on the liquid surface may be coated by a roll coater having gravure rolls used therein while the activator to be coated after the transferring film is floated on the liquid surface may be coated by a spray coater.

As previously described, the liquid pressure pattern-transferring ink of the invention may be applied for a technique in which the pattern-transferring film is fed to the transferring bath and the print pattern is transferred from the transferring film onto the objective body after the transferring film is formed by printing the print pattern on the base film thereof and before the ink is made dry. In this case, since the print pattern on the transferring film is in a state of being swelled, the activator is not required to be coated onto the transferring film. Nevertheless, it is confirmed that the ink of the transferring film in the state of being swelled has a proper hardness and extensibility while maintaining a good extensibility in the same manner as the ink of the transferring film in the state of being treated by the activator after being made dry and that there can be obtained an excellent transferred pattern never losing the sharpness, having no unallowable pinhole made due to be insufficiently closely adhered to the objective body and being never deteriorated as time lapses due to the absorption of moisture in addition to having no disarrangement of the transferred pattern.

Utilizability of Industries

In this manner, the invention is suitably applied for printing a pattern on a surface of an outdoor article such as a car bonnet for a car, a car fender or the like exposed to severe outdoor atmospheres for a long term by a liquid pressure pattern-transferring method.

Furthermore, this invention is also suitable for obtaining the print pattern such as wood grain pattern having a higher amount of the ink to be charged or for obtaining the print pattern such as marble pattern or the like having a lower amount of ink to be charged.

What is claimed is:

1. An ink set of liquid pressure pattern-transferring inks comprising at least a blue ink, a yellow ink and a red ink, each of said inks comprising a resin ingredient and a color pigment for each of said inks wherein said color pigment for said blue ink is a phthalocyanine blue, said color pigment for said yellow ink is an isoindolinone yellow and said color pigment for said red ink is a quinacridone red.

2. An ink set of liquid pressure-pattern transferring inks as set forth in claim 1, further comprising one or both of a white ink and a black ink wherein said color pigment for said white ink is a titanium white and said color pigment for said black ink is a carbon black.

3. An ink set of liquid pressure pattern-transferring inks as set forth in claim 1 or 2, wherein each of said inks further includes a plasticizer, and said resin ingredient comprises a short-oil alkyd resin of 2 to 15 weight % having a cellulose acetate butyrate of 3 to 20 weight % added thereto, said plasticizer having a content of 2 to 4 weight % when the ink is black and having a content of 0.01 to 2 weight % when the ink is of a color other than black.

4. An ink set of liquid pressure pattern-transferring inks as set forth in claim 1 or 2, wherein each of said inks further comprises a plasticizer and said resin ingredient comprises a short-oil alkyd resin having a nitrocellulose of low molecular weight added thereto.

5. An ink set of liquid pressure pattern-transferring inks as set forth in claim 1 or 2, each of said inks comprising a resin ingredient including an alkyd resin as a fundamental component and a pigment, said resin ingredient comprises a short-oil alkyd resin having a nitrocellulose of high molecular weight and a nitrocellulose of low molecular weight added thereto.

6. A liquid pressure pattern-transferring film having a liquid soluble or liquid swelling base film and a print pattern printed on said base film, said print pattern being printed by using a selected ink or inks among printing inks comprising a blue ink, a yellow ink, a red ink, a white ink and a black ink so that either of the yellow ink and the red ink or a combination of at least the yellow and red inks is selected, said printing inks each comprising a resin ingredient and a color pigment, said color pigment for said blue ink being a phthalocyanine blue, said color pigment for said yellow ink being an isoindolinone yellow, said color pigment for said red ink being a quinacridone red, said color pigment for said white ink being a titanium white and said color pigment for said black ink being a carbon black.

7. A liquid pressure pattern-transferring film as set forth in claim 6, wherein each of said printing inks further includes a plasticizer, said resin ingredient comprises a short-oil alkyd resin of 2 to 15 weight % having a cellulose acetate butyrate of 3 to 20 weight % added thereto and said plasticizer has a content of 2 to 4 weight % when the ink is black and having a content of 0.01 to 2 weight percent when the ink is of a color other than black.

8. A liquid pressure pattern-transferring film as set forth in claim 6, wherein said resin ingredient comprises a short-oil alkyd resin having a nitrocellulose of low molecular weight added thereto.

9. A liquid pressure pattern-transferring film as set forth in claim 6, wherein said resin ingredient comprises a short-oil alkyd resin having a nitrocellulose of high molecular weight and a nitrocellulose of low molecular weight added thereto.

10. A liquid pressure pattern-transferred article formed by transferring a print pattern from a pattern-transferring film to an objective body by using a liquid pressure, said print pattern being formed by being printed by using a selected ink or inks among printing inks comprising a blue ink, a yellow ink, a red ink, a white ink and a black ink so that either of the yellow ink and the red ink or a combination of at least the yellow and red inks is selected, said printing inks each comprising a resin ingredient and a color pigment, said color pigment for said blue ink being a phthalocyanine blue, said color pigment for said yellow ink being an isoindolinone yellow, said color pigment for said red ink being a quinacridone red, said color pigment for said white ink being a titanium white and said color pigment for said black ink being a carbon black.

11. A liquid pressure pattern-transferred article as set forth in claim 10, wherein each of said printing inks further includes a plasticizer, said resin ingredient comprises a short-oil alkyd resin of 2 to 15 weight % having a cellulose acetate butyrate of 3 to 20 weight % added thereto and said plasticizer having a content of 2 to 4 weight % when the ink is black and having a content of 0.01 to 2 weight % when the ink is of a color other than black.

12. A liquid pressure pattern-transferred article as set forth in claim 10, wherein said resin ingredient comprises a short-oil alkyd resin having a nitrocellulose of low molecular weight added thereto.

13. A liquid pressure pattern-transferred article as set forth in claim 10, wherein said resin ingredient comprises a short-oil alkyd resin having a nitrocellulose of high molecular weight and a nitrocellulose of low molecular weight added thereto.

14. A method of transferring a print pattern from a pattern-transferring film to an objective body by using a liquid pressure, said print pattern being formed by being printed by using a selected ink or inks among printing inks comprising a blue ink, a yellow ink, a red ink, a white ink and a black ink so that either of the yellow ink and the red ink or a combination of at least the yellow and red inks is selected, said printing inks each comprising a resin ingredient and a color pigment, said color pigment for said blue ink being a phthalocyanine blue, said color pigment for said yellow ink being an isoindolinone yellow, said color pigment for said red ink being a quinacridone red, said color pigment for said white ink being a titanium white and said color pigment for said black ink being a carbon black and said print pattern which is dry on said pattern-transferring film being transferred under said liquid pressure after said print pattern is so treated as to be activated by an activator.

15. A method of transferring a print pattern from a pattern-transferring film to an objective body by using a liquid pressure, said print pattern being formed by being printed by using a selected ink or inks among printing inks comprising a blue ink, a yellow ink, a red ink, a white ink and a black ink so that either of the yellow ink and the red ink or a combination of at least the yellow and red inks is selected, said printing inks each comprising a resin ingredient and a color pigment, said color pigment for said blue ink being a phthalocyanine blue, said color pigment for said yellow ink being an isoindolinone yellow, said color pigment for said red ink being a quinacridone red, said color pigment for white ink being a titanium white and said color pigment for said black ink being a carbon black and said print pattern being transferred under said liquid pressure before said print pattern is dried on said pattern-transferring film.

16. A method of transferring a print pattern from a pattern-transferring film as set forth in claim 14 or 15, wherein each of said printing inks further includes a plasticizer, and said resin ingredient comprises a short-oil alkyd resin of 2 to 15 weight % having a cellulose acetate butyrate of 3 to 20 weight % added thereto and said plasticizer having a content of 2 to 4 weight % when the ink is black and having a content of 0.01 to 2 weight % when the ink is of a color other than black.

17. A method of transferring a print pattern from a pattern-transferring film as set forth in claim 14 or 15, wherein each of said inks further includes a plasticizer, and said resin ingredient comprises a short-oil alkyd resin having a nitrocellulose of low molecular weight added thereto.

18. A method of transferring a print pattern from a pattern-transferring film as set forth in claim 14 or 15, wherein said resin ingredient comprises a short-oil alkyd resin having a nitrocellulose of high molecular weight and a nitrocellulose of low molecular weight added thereto.

* * * * *